United States Patent [19]

Sylling et al.

[11] Patent Number: 5,106,406

[45] Date of Patent: * Apr. 21, 1992

[54] METHOD FOR DESALINATION AND REHABILITATION OF IRRIGATED SOIL

[75] Inventors: Truman V. Sylling, Bonita; Stephen L. Allen, National City, both of Calif.

[73] Assignee: Sotac Corporation, El Centro, Calif.

[*] Notice: The portion of the term of this patent subsequent to May 8, 2007 has been disclaimed.

[21] Appl. No.: 520,104

[22] Filed: May 4, 1990

Related U.S. Application Data

[60] Division of Ser. No. 68,026, Jun. 29, 1987, Pat. No. 4,923,500, which is a continuation-in-part of Ser. No. 732,501, May 9, 1985, Pat. No. 4,687,505, which is a continuation-in-part of Ser. No. 547,866, Nov. 5, 1983, abandoned.

[51] Int. Cl.$^5$ .............................................. A01C 1/06
[52] U.S. Cl. ........................................ 71/77; 71/27; 47/576
[58] Field of Search ....................... 71/1, 27, 65, 77; 47/57.6

[56] References Cited

U.S. PATENT DOCUMENTS

| | | | |
|---|---|---|---|
| 3,900,378 | 8/1975 | Ven et al. | 71/903 X |
| 4,303,438 | 12/1981 | Zaslausky et al. | 71/903 X |
| 4,687,505 | 8/1987 | Sylling et al. | 71/27 |
| 4,923,500 | 5/1990 | Sylling et al. | 71/27 |

Primary Examiner—Ferris Lander
Attorney, Agent, or Firm—Bernard L. Kleinke; William Patrick Waters; Jerry R. Potts

[57] ABSTRACT

Soil conditioning and method for desalination and reclamation of irrigated soil.

18 Claims, No Drawings

METHOD FOR DESALINATION AND REHABILITATION OF IRRIGATED SOIL

CROSS REFERENCE TO RELATED APPLICATION

This is a divisional of Ser. No. 068,026, Jun 29, 1987, now U.S. Pat. No. 4,923,500, May 8, 1990, which is a continuation-in-part of application Ser. No. 06/732,501 filed May 9, 1985 now U.S. Pat. No. 4,687,505, Aug. 18, 1987, which in turn is a continuation-in-part of Ser. No. 547,866, Nov. 2, 1983, now abandoned.

BACKGROUND OF INVENTION

This invention relates generally to soil conditioning and particularly pertains to a method for desalination and reclamation of irrigated soil.

Soils irrigated with water of a high total dissolved solids (salt) content (500 ppm or greater) typically accumulate salts and/or alkalis that inhibit crop growth. Salts, mainly chlorides, carbonates, and sulfates or sodium, potassium, calcium, and magnesium are typically measured as the electrical conductivity (mmhos./cm.$^2$) of a saturation extract of the soil. An electrical conductivity greater than 4.0 mmhos./cm.$^2$ indicates that a soil is saline. In saline soils the effect of salts on plants is mainly indirect; that is, the effect of the salts on osmotic water potential, and the resultant reduced uptake of water by germinating seeds and roots of established plants. An alkaline solid (sodic) is a soil that has accumulated large amounts of sodium and is determined by calculating the sodium absorption ratio (SAR) of the saturation extract of the soil. An SAR greater that 15 indicates that a soil is alkaline. In alkaline soils crop growth is inhibited by sodium toxicity. Typically, alkaline soils are also saline compounding toxic sodium levels with reduced plant water uptake ability. Therefore, alkaline-saline soils are particularly deleterious to seed germination and plant growth. It becomes advantageous to remove sodium from the alkaline soils and calcium from calcareous saline soils.

Soil salinity/alkalinity is highly influenced by physical characteristics of the soil such as, the hydraulic conductivity and infiltration rates. Climate, as it affects the evapotranspiration rates from the soil and plants, also plays an important role in the extent of salt and/or alkali accumulation in the soil. Finally, agricultural irrigation practices have an important part in determining whether salts and/or alkalis will accumulate in soils. Known techniques and practices for removing salts and/or alkalis are often expensive and relatively ineffective. One such technique is to add cattle manure and/or green manures into the top soil to maintain a porous condition that will induce infiltration of water into the soil. In high temperature climates, typical of irrigated arid regions, these organic additions decay rapidly and their influence on soil physical properties is lost. Another technique involves the application of gypsum, sulfuric acid, or elemental sulfur to facilitate the removal of sodium. This technique requires large quantities of materials (typically on the order of tons/acre), considerable manpower and fuel, and is only temporarily effective. Yet another technique previously employed is the mechanical practice of chiseling, deep plowing, and slip plowing to improve water movement into and through the soil profile. This practice is of a relatively short-term benefit because the soils tend to slake down and close up after being irrigated requiring reworking on a yearly basis.

It is therefore desirable to have a method for desalination and reclamation of irrigated soil which is relatively inexpensive, easy to perform and effective to remove the salts and/or alkalis in order to enhance crop yield.

SUMMARY OF THE INVENTION

It is the primary object of the present invention to provide an improved method for desalination and reclamation of irrigated saline and/or alkaline solids.

In accordance with the present invention, soil in which salts and/or alkaline components have built up from irrigation water is treated with anionic low molecular weight synthetic polymeric compounds and/or organophosphorous compounds to inactivate or remove the salts and/or alkaline components and to improve the crop yielding ability of the soil.

The compounds are added to the soil in a number of different ways. The compounds may be (a) added directly to the soil in a dry or semi-dry condition and when water is later added, the soil is conditioned. Water is necessary to my process. Water permits my compounds to combine with or carry the salt in the soil away from the germinating seed and/or roots of the plants. The compounds may be added with water, i.e., the irrigation water, water supplied directly to the germinating seeds or to roots of the plants. (c) Also, the plant seeds may be coated with our compounds so that when the seedlings are planted and then watered, my compounds treat the soil surrounding the seedlings. (d) Further, the coating may be an appropriate time-release coating with the benefits provided thereby. (e) The compounds themselves may be prepared as time release compounds so that their beneficial aspects are released into the soil each time soil is watered.

The soils are treated with phosphoric acids and their neutral salts and anionic compounds having threshold properties selected from: anionic compounds and their salts of the formula:

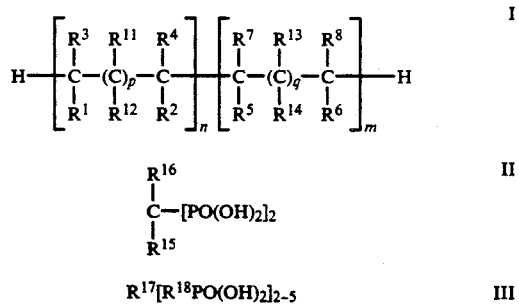

wherein:

$R^1$ is hydroxyl, COOH, $C_6H_5$COOH, NHC(O)R$^9$COOH, phenol, COOR$^9$, COOR$^9$, SO$_3$H, $C_6H_5$SO$_3$H, R$^9$SO$_3$H, COOR$^9$SO$_3$H, OSO$_3$H, $C_6H_5$OSO$_3$H, OR$^9$SO$_3$H, OR$^9$OSO$_3$H, OP(OH)$_2$, R$^9$P(OH)$_2$O, or phenyl;

$R^2$ is hydrogen or COOH;

$R^3$ is hydrogen or $C_1$-$C_4$ alkyl;

$R^4$ is hydrogen or $C_1$-$C_4$ alkyl;

$R^5$ is hydrogen, COOH, $C_6H_5$COOH, NHC(O)R$^9$COOH, phenol, COOR$^9$, COOR$^9$, SO$_3$H, $C_6H_5$SO$_3$H, R$^9$SO$_3$H, COOR$^9$SO$_3$H, OSO$_3$H, $C_6H_5$OSO$_3$H, OR$^9$SO$_3$H, OR$^9$OSO$_3$H, OP(OH)$_2$, R$^9$P(OH)$_2$O, or phenyl, OR$^{10}$, hydroxyl or pyrrolidone;
R$^6$ is hydrogen or COOH;
R$^7$ is hydrogen or C$_1$–C$_4$ alkyl;
R$^8$ is hydrogen or C$_1$–C$_4$ alkyl;
R$^9$ is C$_1$–C$_4$ alkyl;
R$^{10}$ is C$_1$–C$_4$ alkyl;
R$^{11}$ is hydrogen or CH$_3$;
R$^{12}$ and R$^{13}$ are hydrogen;
R$^{14}$ is hydrogen or CH$_3$;
R$^{15}$ is hydrogen, hydroxyl or C$_1$–C$_4$ alkyl;
R$^{16}$ is hydrogen or C$_1$–C$_4$ alkyl;
R$^{17}$ is N, NR$^{19}$N, NR$^9$NR$^9$N;
R$^{18}$ is C$_1$–C$_4$ alkyl;
R$^{19}$ is C$_1$–C$_6$ alkyl;
R$^1$ and R$^2$ when taken together are anhydride;
R$^5$ and R$^6$ when taken together are anhydride;
n and m are independently 3–100;
p and q are independently 0–3.

DETAILED DESCRIPTION

I have found that certain anionic materials or their substantially neutral water soluble salts applied to a soil in minute amounts are effective to reduce the harmful effects of salts and/or alkalis which had accumulated in the soil from irrigation water. Thus, soil in which such salts and/or alkalis have reached the concentration that whitish deposits appreared on its surface and on which crop growth was unacceptably low is restored to useful fertility level through the action of these materials.

Specific compounds which are useful in our invention are listed as the following. Of course, their acceptable salts are included as part of the following list.
polymaleic acid;
polyacrylic acid;
polymethacrylic acid;
poly(4-vinylbenzoic acid);
poly(N-vinylsuccinamidic acid);
poly(ethylene sulfonic acid)poly(ethylene sulfuric acid);
poly(4-vinylphenyl sulfonic acid);
poly(4-vinylphenyl sulfuric acid);
poly(2-methacryloyloxyethane-1-sulfonic acid);
poly(3-methacryloyloxypropane-1-sulfonic acid);
poly(3-(vinyloxy)propane-1-sulfonic acid);
poly(4-vinylphenol);
poly(ethylenephosphonic acid);
poly(acrylic acid-co-methacrylic acid);
poly(acrylic acid-co-methyl acrylate);
poly(acrylic acid-co-ethyl acrylate);
poly(acrylic acid-co-maleic acid);
poly(acrylic acid-co-4-vinylphenol);
poly(acrylic acid-co-4-vinylbenzoic acid);
poly(acrylic acid-co-n-vinylsuccinamidic acid);
poly(acrylic acid-co-ethylene sulfonic acid);
poly(acrylic acid-co-ethylene sulfuric acid);
poly(acrylic acid-co-4-vinylphenyl sulfonic acid);
poly(acrylic acid-co-4-vinylphenyl sulfuric acid);
poly(acrylic acid-co-2-methacryloyloxyethane-1-sulfonic acid;
poly(acrylic acid-co-3-(vinyloxy)propane-1-sulfonic acid);
poly(acrylic acid-co-3-(vinyloxy)propane-1-sulfuric acid);
poly(acrylic acid-co-vinyl alcohol);
poly(acrylic acid-co-ethylenephosphonic acid);
poly(acrylic acid-co-vinyl ethers);
poly(acrylic acid-co-ethylene);
poly(acrylic acid-co-propylene);
poly(acrylic acid-co-isobutylene);
poly(acrylic acid-co-styrene);
poly(acrylic acid-co-vinylpyrrolidone);;
poly(methacrylic acid-co-methyl acrylate);
poly(methacrylic acid-co-ethyl acrylate);
poly(methacrylic acid-co-maleic acid);
poly(methacrylic acid-co-4-vinylbenzoic acid);
poly(methacrylic acid-co-n-vinylsuccinamidic acid);
poly(methacrylic acid-co-ethylene sulfonic acid);
poly(methacrylic acid-co-ethylene sulfuric acid);
poly(methacrylic acid-co-4-vinylphenyl sulfonic acid);
poly(methacrylic acid-co-4-vinylphenyl sulfuric acid);
poly(methacrylic acid-co-2-methacryloyloxyethane-1-sulfonic acid);
poly(methacrylic acid-co-3-methacryloyloxyethane-1-sulfonic acid);
poly(methacrylic acid-co-3(vinyloxy)propane-1-sulfonic acid);
poly(methacrylic acid-co-vinyl alcohol);
poly(methacrylic acid-co-4-vinylphenol);
poly(methacrylic acid-co-ethylenephosphonic acid);
poly(methacrylic acid-co-vinyl ethers);
poly(methacrylic acid-co-ethylene);
poly(methacrylic acid-co-propylene);
poly(methacrylic acid-co-isobutylene);
poly(methacrylic acid-co-styrene);
poly(methacrylic acid-co-vinylpyrrolidone);
poly(maleic acid-co-methyl acrylate);
poly(maleic acid-co-ethyl acrylate);
poly(maleic acid-co-4-vinylbenzoic acid);
poly(maleic acid-co-n-vinylsuccinamidic acid);
poly(maleic acid-co-ethylene sulfonic acid);
poly(maleic acid-co-ethylene sulfuric acid);
poly(maleic acid-co-4-vinylphenyl sulfonic acid);
poly(maleic acid-co-4-vinylphenyl sulfuric acid);
poly(maleic acid-co-2-methacryloyloxyethane-1-sulfonic acid);
poly(maleic acid-co-methacryloyloxypropane-1-sulfonic acid);
poly(maleic acid-co-3-(vinyloxy)propane-1-sulfonic acid);
poly(maleic acid-co-vinyl alcohol);
poly(maleic acid-co TM 4-vinylphenol);
poly(maleic acid-co-ethylenephosphonic acid);
poly(maleic acid-co-vinyl ethers);
poly(maleic acid-co-ethylene);
poly(maleic acid-co-propylene);
poly(maleic acid-co-isobutylene);
poly(maleic acid-co-styrene);
poly(maleic acid-co-vinylpyrrolidone);
poly(4-vinylbenzoic acid-co-methacrylic acid);
poly(4-vinylbenzoic acid-co-methyl acrylate);
poly(4-vinylbenzoic acid-co-ethyl acrylate);
poly(4-vinylbenzoic acid-co-n-vinylsuccinamidic acid);
poly(4-vinylbenzoic acid-co-ethylene sulfonic acid);
poly(4-vinylbenzoic acid-co-ethylene sulfuric acid);
poly(4-vinylbenzoic acid-co-4-vinylphenyl sulfonic acid);
poly(4-vinylbenzoic acid-co-4-vinylphenyl sulfuric acid);
poly(4-vinylbenzoic acid-co-2-methacryloyloxyethane-1-sulfonic acid);
poly(4-vinylbenzoic acid-co-3-methacryloyloxyethane-1-sulfonic acid);
poly(4-vinylbenzoic acid-co-3-(vinyloxy)propane-1-sulfonic acid);
poly(4-vinylbenzoic acid-co-vinyl alcohol);

poly(4-vinylbenzoic acid-co-4-vinylphenol);
poly(4-vinylbenzoic acid-co-ethylenephosphonic acid);
poly(4-vinylbenzoic acid-co-vinyl ethers);
poly(4-vinylbenzoic acid-co-ethylene);
poly(4-vinylbenzoic acid-co-propylene);
poly(4-vinylbenzoic acid-co-isobutylene);
poly(4-vinylbenzoic acid-co-styrene);
poly(4-vinylbenzoic acid-co-vinylpyrrolidone);
poly(vinyl sulfonic acid-co-n-vinylsuccinamidic acid);
poly(vinyl sulfonic acid-co-vinyl sulfuric acid);
poly(vinyl sulfonic acid-co-4-vinylphenyl sulfonic acid);
poly(vinyl sulfonic acid-co-4-vinylphenyl sulfuric acid);
poly(vinyl sulfonic acid-co-2-methacryloyloxyethane-1-sulfonic acid);
poly(vinyl sulfonic acid-co-3-methacryloyloxypropane-1-sulfonic acid);
poly(vinyl sulfonic acid-co-3-(vinyloxy)propane-1-sulfonic acid);
poly(vinyl sulfonic acid-co-vinyl alcohol);
poly(vinyl sulfonic acid-co-4-vinylphenol);
poly(vinyl sulfonic acid-co-ethylenephosphonic acid);
poly(vinyl sulfonic acid-co-vinyl ethers);
poly(vinyl sulfonic acid-co-ethylene);
poly(vinyl sulfonic acid-co-propylene);
poly(vinyl sulfonic acid-co-isobutylene);
poly(vinyl sulfonic acid-co-styrene);
poly(vinyl sulfonic acid-co-vinylpyrrolidone);
poly(vinyl sulfuric acid-co-n-vinylsuccinamidic acid);
poly(vinyl sulfuric acid-co-4-vinylphenyl sulfonic acid);
poly(vinyl sulfuric acid-co-4-vinylphenyl sulfuric acid);
poly(vinyl sulfuric acid-co-2-methacryloyloxyethane-1-sulfonic acid);
poly(vinyl sulfuric acid-co-3-methacryloyloxypropane-1-sulfonic acid);
poly(vinyl sulfuric acid-co-3-(vinyloxy)propane-1-sulfonic acid);
poly(vinyl sulfuric acid-co-vinyl alcohol);
poly(vinyl sulfuric acid-co-4-vinylphenol);
poly(vinyl sulfuric acid-co-ethylenephosphonic acid);
poly(vinyl sulfuric acid-co-vinyl ethers);
poly(vinyl sulfuric acid-co-ethylene);
poly(vinyl sulfuric acid-co-propylene);
poly(vinyl sulfuric acid-co-isobutylene);
poly(vinyl sulfuric acid-co-styrene);
poly(vinyl sulfuric acid-co-vinylpyrrolidone);
poly(vinylphenyl sulfonic acid-co-n-vinylsuccinamidic acid);
poly(4-vinylphenyl sulfonic acid-co-4-vinylphenyl sulfuric acid);
poly(4-vinylphenyl sulfonic acid-co-2-methacryloyloxyethane-1-sulfonic acid);
poly(4-vinylphenyl sulfonic acid-co-3-methacryloyloxypropane-1-sulfonic acid);
poly(4-vinylphenyl sulfonic acid-co-3-(vinyloxy)propane-1-sulfonic acid);
poly(4-vinylphenyl sulfonic acid-co-vinyl alcohol);
poly(4-vinylphenyl sulfonic acid-co-4-vinylphenol);
poly(4-vinylphenyl sulfonic acid-co-ethylenephosphonic acid);
poly(4-vinylphenyl sulfonic acid-co-vinyl ethers);
poly(4-vinylphenyl sulfonic acid-co-ethylene);
poly(4-vinylphenyl sulfonic acid-co-propylene);
poly(4-vinylphenyl sulfonic acid-co-isobutylene);
poly(4-vinylphenyl sulfonic acid-co-styrene);
poly(4-vinylphenyl sulfonic acid-co-vinylpyrrolidone);
poly(4-vinylphenyl sulfonic acid-co-n-vinylsuccinamidic acid);
poly(4-vinylphenyl sulfuric acid-co 2-methacryloyloxyethane-1-sulfonic acid);
poly(4-vinylphenyl sulfuric acid-co-3-methacryloyloxypropane-1-sulfonic acid);
poly(4-vinylphenyl sulfuric acid-co-3-(vinyloxy)propane-1-sulfonic acid);
poly(4-vinylphenyl sulfuric acid-co-vinyl alcohol);
poly(4-vinylphenyl sulfuric acid-co-4-vinylphenol);
poly(4-vinylphenyl sulfuric acid-co-ethylenephosphonic acid);
poly(4-vinylphenyl sulfuric acid-co-vinyl ethers);
poly(4-vinylphenyl sulfuric acid-co-ethylene);
poly(4-vinylphenyl sulfuric acid-co-propylene);
poly(4-vinylphenyl sulfuric acid-co-isobutylene);
poly(4-vinylphenyl sulfuric acid-co-styrene);
poly(4-vinylphenyl sulfuric acid-co-vinylpyrrolidone);
poly(2-methacryloyloxyethane-1-sulfonic acid-co-n-vinylsuccinamidic acid);
poly(2-methacryloyloxyethane-1-sulfonic acid-co-3-methacryloyloxypropane-1-sulfonic acid);
poly(2-methacryloyloxyethane-1-sulfonic acid-co-3-(vinyloxy)propane-1-sulfonic acid);
poly(2-methacryloyloxyethane-1-sulfonic acid-co-3-(vinyloxy)propane-1-sulfonic acid);
poly(2-methacryloyloxyethane-1-sulfonic acid-co-vinyl alcohol);
poly(2-methacryloyloxyethane-1-sulfonic acid-co-4-vinylphenol);
poly(2-methacryloyloxyethane-1-sulfonic acid-co-ethylenephosphonic acid);
poly(2-methacryloyloxyethane-1-sulfonic acid-co-vinyl ethers)
poly(2-methacryloyloxyethane-1-sulfonic acid-co-ethylene);
poly(2-methacryloyloxyethane-1-sulfonic acid-co-propylene);
poly(2-methacryloyloxyethane-1-sulfonic acid-co-butylene);
poly(2-methacryloyloxyethane-1-sulfonic acid-co-isobutylene);
poly(2-methacryloyloxyethane-1-sulfonic acid-co-styrene);
poly(2-methacryloyloxyethane-1-sulfonic acid-co-vinylpyrrolidone);
poly(3-methacryloyloxyethane-1-sulfonic acid-co-n-vinylsuccinamidic acid);
poly(2-methacryloyloxyethane-1-sulfonic acid-co-n-vinylsuccinamidic acid);
poly(2-methacryloyloxyethane-1-sulfonic acid-co-3-(vinyloxy)propane-1-sulfonic acid);
poly(3-methacryloyloxypropane-1-sulfonic acid-co-3-(vinyloxy)propane-1-sulfonic acid);
poly(3-methacryloyloxypropane-1-sulfonic acid-co-vinyl alcohol)
poly(3-methacryloyloxypropane-1-sulfonic acid-co-4-vinylphenol)
poly(3-methacryloyloxypropane-1-sulfonic acid-co-ethylenephosphonic acid);
poly(3-methacryloyloxypropane-1-sulfonic acid-co-vinyl ethers);
poly(3-methacryloyloxypropane-1-sulfonic acid-co-ethylene);
poly(3-methacryloyloxyethane-1-sulfonic acid-co-propylene);
poly(3-methacryloyloxypropane-1-sulfonic acid-co-isobutylene);
poly(3-methacryloyloxypropane-1-sulfonic acid-co-styrene);

poly(3-methacryloyloxypropane-1-sulfonic acid-co-vinylpyrrolidone);
poly(3-(vinyloxy)propane-1-sulfonic acid-co-vinylsuccinamidic acid);
poly(3-(vinyloxy)propane-1-sulfonic acid-co-vinylalcohol);
poly(3-(vinyloxy)propane-1-sulfonic acid-co-4- vinylphenol);
poly(3-(vinyloxy)propane-1-sulfonic acid-co-ethylenephosphonic acid);
poly(3-(vinyloxy)propane-1-sulfonic acid-co-vinyl ethers);
poly(3-(vinyloxy)propane-1-sulfonic acid-co-ethylene);
poly(3-(vinyloxy)propane-1-sulfonic acid-co-propylene);
poly(3-(vinyloxy)propane-1-sulfonic acid-co-isobutylene);
poly(3-(vinyloxy)propane-1-sulfonic acid-co-styrene);
poly(3-(vinyloxy)propane-1-sulfonic acid-co-vinylpyrrolidone);
poly(vinyl alcohol-co-n-vinylsuccinamidic acid);
poly(vinyl alcohol-co-4-vinylphenol);
poly(vinyl alcohol-co-ethylenephosphonic acid);
poly(4-vinylphenol-co-n-vinylsuccinamidic acid);
poly(4-vinylphenol-co-ethylenephosphonic acid);
poly(4-vinylphenol-co-vinyl ethers);
poly(4-vinylphenol-co-vinylpyrrolidone);
poly(ethylenephosphonic acid-co-vinylsuccinamidic acid);
poly(ethylenephosphonic acid-co-vinyl ethers);
poly(ethylenephosphonic acid-co-ethylene);
poly(ethylenephosphonic acid-co-propylene);
poly(ethylenephosphonic acid-co-isobutylene);
poly(ethylenephosphonic acid-co-styrene);
poly(ethylenephosphonic acid-co-vinylpyrrolidone);
1-hydroxyethylidene-1-diphosphonic acid;
nitrilo trismethylene triphosphonic acid;
ethylene bis (nitrilo dimethylene)tetraphosphonic acid;
diethyltriamine penta(methylene phosphonic acid);
ethanolamine N.N-di(methylene phosphoric acid);
hexamethylenediamine tetra(methylene phosphoric acid).

The material(s) is/are applied suitably by incorporation in irrigation water to insure uniform distribution in the soil in depth. Alternative applications involve spraying, injecting, "flying on" the material(s) directly to the ground. The material can be supplied directly to the seedlings, the roots of plants by direct watering systems, may be planted with the seeds, used to coat the seeds, the seed coating may be a time release coating, and also the materials of my invention may have a time release coating thereon so that their effect can be used to treat the soil over a preselected time period.

The amount of active material(s) required per unit area will depend on the extent to which salts and/or alkalis have accumulated, but the amount is not in stoichiometric relation to the salt and/or alkali concentration in the soil. No exact figures can be given since the nature of the soil also affects the amount of active material(s) required, but for moderate salt and/or alkali accumulation, useful effects have been obtained by application of from 0.1 pound to 15.0 pounds per acre over a 4- to 48-hour period, while for heavy accumulation, from 1.0 to 25.0 pounds per acre over a 12- to 96-hour period may be needed. The material(s) is/are preferably applied in a plurality of spaced treatments to insure improvement of the soil in depth, and the treatments may continue in extreme cases until the soil is fully saturated.

Anionic materials having threshold activity suitable for use in the present soil treatment process include low molecular weight, water miscible synthetic polymers, organosulfuric acids, organophosphorous acids, and substantially neutral salts of these. Threshold activity refers to sub-stoichiometric chemical processes of which dispersancy and calcium carbonate stabilization are important factors. As described in *Journal Of The Cooling Tower Institute*, Vol. 3, No. 1, Winter 1982, page 17 et seq., in the article of Leonard Deubin entitled "The Effect of Organophosphorus Compounds And And Polymers on $CaCO_3$ Crystal Morphology," calcium carbonate stabilization is understood to involve an increase in average particle size and a change in the gross shape of calcium carbonate crystals, and dispersancy involves surface charge effects.

Anionic polymeric materials for use in the present process include polymers, copolymers and sulfonated polymers and copolymers of acrylic acid, methacrylic acid, hydrolyzed polymers and copolymers of maleic anhydride and substantially neutral water soluble salts of these. The commercially available material known as "Belclene 200," a product of Ciba-Geigy Corporation, of Ardsley, N.Y., which is understood to be a water soluble hydrolyzed maleic anhydride polymer having low molecular weight, e.g. from 300 to 5000, or salt of such polymer, has been found particularly useful.

Organophosphorus agents for use in soil treating include phosphonic acids as hydroxyethylidene diphosphonic acid, amino tri (methylenephosphonic acid), and nitrilo trismethylene triphosphonic acid, phosphonic acids such as phosphinocarboxylic acid, and substantially neutral salts of these acids.

These anionic polymers, organophosphorus acids, and/or substantially neutral water soluble salts of these may be used alone or in combination of two or more.

High molecular weight polymethacrylates are used as ion exchange fertilizers as described in U.S. Pat. No. 4,396,412. The form of the polymethacrylate is a solid to which various fertilizer constituents are bound. These ion exchange fertilizers are useful in soils that are subjected to waters with a low salt content such as in hydroponic agriculture. It is an intent of this invention to use low molecular weight liquid. polymethacrylates on soils subjected to irrigation with high salt waters and is not intended as a means of introducing fertilizers to crops.

To those versed in the art it is understood that applying to soils various species of organophosphorus compounds is common for the addition of micro-nutrients such as iron, manganese, and other essential metals as described in U.S. Pat. No. 3,958,972. This invention relates to the use of these compounds to lower harmful salts and/or alkalis and to improve a crops ability to absorb water.

U.S. Pat. No 4,098,814 describes a method for manufacturing several species of organophosphorus compounds and suggests their use in the manufacture of liquid fertilizers to prevent mineral deposits from forming in the manufacturing equipment. It is not the intent of this invention to prescribe a method for manufacturing these compounds or the use thereof in the manufacture of liquid fertilizers.

Our invention relates to a new use or method of using known compounds to achieve unexpected results. These compounds as described above in detail increase the solubility of sodium, potassium, calcium, and magnesium salts by dispersing these salts found in the soil pore spaces. These salts when dispersed have a large increase in surface area that is available to be wetted, effectively shifting the equilibrium from the solid phase to the dissolved liquid phase. I believe that the precipitated salts are dispersed because the Helmholtz double layer model for dispersancy is satisfied by the presence of the high negative charge density of these compounds. Additionally, the precipitation of dissolved sodium, potassium, calcium, and magnesium salts present in the irrigation water is inhibited as the soil drys. This is a result of crystal distortion effects at the surfaces of forming crystals. The net effect of both mechanisms (dispersancy and crystal distortion) in calcareous saline soils is the removal of precipitated calcium salts from the soil pore spaces. The net effect of both mechanisms (dispersancy and crystal distortion) in sodic alkaline soils is to provide excess calcium and magnesium cations to displace sodium from the colloidal clay surface resulting in sub-stoichiometrically induced cation exchange, facilitating the removal of sodium from the soil. The action of these compounds forces the mineral salts deep into the soil or discharges them through the field tile drains, resulting in an improved drainage and percolation rate, reduction of soil salts and/or alkalis, improvement in the crops ability to absorb water, and increase germination and yield.

It is to be understood that this proposed mechanism is advanced only as a possible assistance in understanding the invention and that patentability is based on the novelty and utility of the process and not the correctness of the mechanism proposed.

The following examples are given to aid in understanding the invention, but it is not limited to the particular procedures, condition s or materials of the examples. In each case there was noted an increase in the percent of seeds geminated as well as an increase in the rate of germination, that is the seeds began to grow more rapidly and in greater numbers. Also, there was noted an improvement in the percolation of the soil as evidenced by a marked increase in salinity and flow of water through drain tile. Furthermore, there was a very evident removal of encrusted salt on the soil surface. Each example is representative of other experimental treatments performed on Imperial Valley agricultural land in Imperial County, Calif.

EXAMPLES

EXAMPLE 1

A commercially producing alfalfa field in Imperial Counta, Calif., newly planted with 40.0 lbs. per acre of alfalfa seed was selected as a test plot. The field consists of several border irrigated lands. Four lands were used for the test: 2 controls and 2 treated with a low molecular weight, anionic, maleic acid based co-polymer (Belcline 283, a commercially available product of Ciba-Geigy Corp, Ardsley, N.Y).

The soil survey report of the USDA's Soil Conservation Service shows that a soil type in these lands is representative of many irrigated farms in the U.S. desert southwest. It is a medium textured silty clay loam which is moderately saline-alkaline, and slowly permeable.

The treated lands received 3.0 lbs. per acre of the co-polymer solution (50% Active Ingredient: 50% water) in the germination irrigation and two subsequent irrigations. Following harvesting, (cutting and baling), the treatment was reduced to 2.5 lbs. per acre in each irrigation. In all applications the soil desalination agent was added to the irrigation water through a constant head drip siphon at the time of irrigation for the two treated lands.

The field was allowed to grow and establish through the winter months with harvesting beginning in early May and then monthly through the summer an diminishing through the fall and winter. The desert temperatures increased to 105° F. on average from May until early October.

Compared to controls the treated lands maintained an average yield improvement of 27%.

EXAMPLE 2

Simultaneously, using the same procedure as described in Example 1, another field was treated with a soil desalination agent as described in Example 1 using a low moleculor weight, anionic, homopolymer salt of sodium polyacrylate (P-70, a commercially available product of American Cyanamide of Wayne, N.J.).

The results were similar to that in Example 1. The yields of the treated lands maintained an average 22% improvement over controls.

EXAMPLE 3

Using the procedure of Example 1 and, at the same time, yet another field was treated with the phosphonic acid, a soil desalination agent, 1-hydroxyethylidene-1-diphosphonic acid (Tecquest 360, a commercially available product of BRJ Industries, Wheeling, Ill.)

Similarly to the Examples 1 and 2 the yields of the treated lands maintained an average 12% improvement over the controls.

EXAMPLE 4

Undisturbed soil cores from the surface were taken in the Imperial County, Calif., area. The cores were obtained by using a backhoe to press eight inch diameter, twenty inch length fiberglass pipes twelve inches into the soil. Three control and three treated cores were set up to receive irrigations and to collect leachates from the bottom of the cores for analysis The control cores were irrigated with 843 ml. (equivalent to 1.0 acre-inch) of Colorado River water (700 ppm TDS).

The treated cores were irrigated with the same amount of Colorado River water with the dissolved equivalent of 3.0 lbs. per acre of maleic acid based co-polymer of Example 1.

All cores were irrigated as above every 7–10 days and leachates were collected for analysis. The experiment was terminated at day 120.

The results showed (1) an improvement in the rate of sodium removal for each irrigation and (2) an accumulative removal of 40% more sodium when compared to the controls.

EXAMPLE 5

Another undisturbed solid core experiment according to the procedure described in Example 4, was performed with sodium polyacrylate of Example 2 as the soil desalination agent.

The results also showed (1) an improvement in the rate of sodium removed from each irrigation and (2) and accumulative removal of 31% more sodium when compared to the controls.

EXAMPLE 6

Yet another undisturbed soil core experiment according to the procedure described in Example 4 was performed with the phosphonic acid, soil desalination agent 1-hydroxyethylidene-1-diphosphonic acid.

Similar results were achieved with an accumulative removal of 18% more sodium when compared to the controls.

EXAMPLE 7

To demonstrate improved early development of salt sensitive seeds and seedlings, the following was performed. 300 gms. each of a saline-alkaline soil as described in Example 1 were placed into two styrofoam containers, one controls and one for treated seeds. The container bottoms had six holes of equal size for drainage. To each container twenty lettuce seeds (a salt sensitive crop) were farefully placed one quarter of an inch below the surface. The control was irrigated with 150 ml. of Colorado River water. The treated soil was irrigated with 150 ml. of 100 ppm maleic acid based copolymer. The containers were then watered every other day with 150 ml. of water for the control and 150 ml. of 100 ppm soil desalination agent for the treated seeds. The experiment was terminated after 20 days.

After twenty days, 80% of the control seeds germinated with 40% surviving and 85% of the treated seeds germinated with 75% surviving.

EXAMPLE 8

Example 7 is repeated using sodium polyacrylate as the soil desalination agent.

Similar results as in Example 7 were obtained. After 20 days, 75% of the control seeds germinated with 40% surviving and 90% of the treated seeds germinated with 80% surviving.

EXAMPLE 9

Example 7 is repeated using the phosphonic acid, 1-hydroxyethylidene-1-diphophonic acid as the soil desalination agent.

The results were for the control a 75% seed germination with 45% surviving and for the treated a 75% seed germination with 60% surviving.

EXAMPLE 10

Example 7 is repeated using poly (4-vinylbenzoic acid as the soil desalination agent. The results were for the control 80% seeds germination with 50% surviving and for the treated 80% seed germination with 65% surviving. This soil desalination agent did not appear to have quite the dispersing action as other agents.

We claim:

1. A method of coating a seed for improving the propagation thereof, comprising:

using anionic compound wherein the anionic compound is selected from the formula:

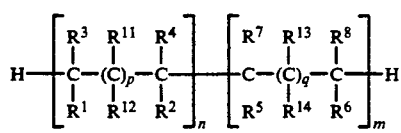

I

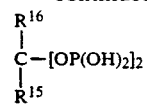

II

III wherein:
R$^1$ is hydroxyl, COOH, C$_6$H$_5$COOH, NHC(O)R$^9$COOH, phenol, COOR$^9$, COOR$^9$, SO$_3$H, C$_6$H$_5$SO$_3$H, R$^9$SO$_3$H, COOR$^9$SO$_3$H, OSO$_3$H, C$_6$H$_5$OSO$_3$H, OR$^9$SO$_3$H, OR$^9$OSO$_3$H, OP(OH)$_2$, R$^9$P(OH)$_2$O, or phenyl;
R$^2$ is hydrogen or COOH;
R$^3$ is hydrogen or C$_1$-C$_4$ alkyl;
R$^4$ is hydrogen or C$_1$-C$_4$ alkyl;
R$^5$ is hydrogen, COOH, C$_6$H$_5$COOH, NHC(O)R$^9$COOH, phenol, COOR$^9$, COOR$^9$, SO$_3$H, C$_6$H$_5$SO$_3$H, R$^9$SO$_3$H, COOR$^9$SO$_3$H, OSO$_3$H, C$_6$H$_5$OSO$_3$H, OR$^9$SO$_3$H, OR$^9$OSO$_3$H, OP(OH)$_2$, R$^9$P(OH)$_2$O, or phenyl, OR$^{10}$, hydroxyl or pyrrolidone;
R$^6$ is hydrogen or COOH;
R$^7$ is hydrogen or C$_1$-C$_4$ alkyl;
R$^8$ is hydrogen or C$_1$-C$_4$ alkyl;
R$^9$ is C$_1$-C$_4$ alkyl;
R$^{10}$ is C$_1$-C$_4$ alkyl;
R$^{11}$ is hydrogen or CH$_3$;
R$^{12}$ and R$^{13}$ are hydrogen;
R$^{14}$ is hydrogen or CH$_3$;
R$^{15}$ is hydrogen, hydroxyl or C$_1$-C$_4$ alkyl;
R$^{16}$ is hydrogen or C$_1$-C$_4$ alkyl;
R$^{17}$ is N, NR$^{19}$N, NR$^9$NR$^9$N;
R$^{19}$ is C$_1$-C$_6$ alkyl;
R$^1$ and R$^2$ when taken together are anhydride;
R$^5$ and R$^6$ when taken together are anhydride;
n and m are independently 3-100;
p and q are independently 0-3
applying said compound to coat the outer surface of a seed.

2. A method of propagating seeds comprising:
treating seeds with an anionic compound having soil desalinating characteristics as set forth in claim 1, to coat the seed with said compound;
sowing the coated seeds;
applying irrigation liquids to the ground in the vicinity of the treated seeds;
dissolving the compound coating the seed to desalinate the soil near the seed to protect the seed during the initial phase of germination thereof.

3. Process of claim 1 wherein said anionic compounds are selected from Formula I and are applied directly to the soil prior to or with watering.

4. The process of claim 1 wherein the anionic compounds are selected from Formula I and wherein p and q are 0;
R$^3$ is hydrogen or methyl; R$^4$R$^7$ and R$^8$ are hydrogen; R$^1$ and R$^5$ are COOH; and R$^2$ and R$^6$ are hydrogen or COOH.

5. The process of claim 1 wherein the anionic compounds are selected from Formula I and wherein
p and q are 0,
R$^2$, R$^4$, R$^6$, R$^7$ and R$^8$ are hydrogen, and
R$^1$ and R$^5$ are the same.

6. The process of claim 1 wherein
p and q are 0,
R$^2$, R$^3$, R$^4$, R$^6$ and R$^8$ are hydrogen;

$R^1$ is COOH; and
$R^5$ is COOH or $COOR^9$.

7. The process of claim 1 wherein p and q are 0; $R^2$, $R^3$, $R^4$, $R^7$ and $R^8$ are hydrogen; $R^1$, $R^5$, and $R^6$ are COOH.

8. The process of claim 1 wherein
$R^1$ is COOH or its acceptable salt;
p and q are 0; and
$R^2$, $R^3$, $R^4$, $R^6$ and $R^8$ are hydrogen.

9. The process of claim 1 wherein $R^1$ and $R^2$ are both COOH or its acceptable salt;
p and q are 0; and
$R^3$ and $R^4$ are hydrogen.

10. The process of claim 1 wherein
$R^1$ is $C_6H_5COOH$ or its acceptable salt;
$R^2$, $R^3$, $R^4$, $R^6$ and $R^8$ are hydrogen; and
p and q are 0.

11. The process of claim 1 wherein
$R^1$ is $SO_3H$, $OSO_3H$, $R^9 SO_3H$, $C_6H_5SO_3H$; $C_6H_5OSO_3H$, $COOR_9SO_3H$ or $OR_9SO_34$;
$R^2$, $R^3$, $R^4$, $R^6$ and $R^8$ are hydrogen; and
p and q are 0.

12. The process of claim 1 wherein
$R^1$ is hydroxyl, phenol, or the acceptable salts thereof, or $OP(OH)2$;
$R^2$, $R^3$, $R^4$, $R^6$ and $R^8$ are hydrogen;
$R^5$ is $NHC(O)R_9COOH$, phenol, $OP(OH)_2$ $OR_9$, phenyl, pyrrolidone or the acceptable salts thereof.

13. The process of claim 1 wherein
$R_1$ is COOH, $C_6H_5COOH$, $SO_3H$, $OSO_3H$, $C_6H_5SO_3H$, $C_6H_3OSO_3H$, $COOR_9SO_3H$, $OR_9SO_3H$.
$R^2$ is hydrogen or COOH;
$R^3$ is hydrogen or $R^9$
$R^2$, $R^5$, $R^6$, $R^7$ and $R^9$ are hydrogen.
p is 0 is q is 1.

14. The process of claim 1 wherein $R^2$ is hydrogen.

15. The process of claim 1 wherein
$R^1$ and $R^2$ are COOH or their acceptable salts.

16. The process of claim 1 wherein the anionic compounds are selected from formula I and wherein
$R^1$ is COOH or its salts; and
$R^5$ is hydrogen or COOH.

17. The process of claim 1 wherein the anionic compounds are selected from formula II or III and are applied directly to the soil prior to or with watering.

18. The process of claim 1 wherein
$R^1$ is hydroxyl, $OP(OH)2$ or $R^9P(OH)20$;
$R^6$ is hydrogen.

* * * * *